12) United States Patent
Yuan et al.

(10) Patent No.: US 11,064,569 B2
(45) Date of Patent: Jul. 13, 2021

(54) NETWORK SHARING METHOD, NETWORK ACCESSING METHOD AND SYSTEM

(71) Applicant: HUIZHOU TCL MOBILE COMMUNICATION CO., LTD., HuiZhou (CN)

(72) Inventors: Longquan Yuan, HuiZhou (CN); Yonglin Liao, HuiZhou (CN); Shengpeng Liao, HuiZhou (CN); Xinyao Ye, HuiZhou (CN); Yajun Hu, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 93 days.

(21) Appl. No.: 16/346,494

(22) PCT Filed: Oct. 24, 2017

(86) PCT No.: PCT/CN2017/107526
§ 371 (c)(1),
(2) Date: Apr. 30, 2019

(87) PCT Pub. No.: WO2018/082482
PCT Pub. Date: May 11, 2018

(65) Prior Publication Data
US 2019/0297656 A1    Sep. 26, 2019

(30) Foreign Application Priority Data
Nov. 1, 2016 (CN) .......................... 201610937052.0

(51) Int. Cl.
H04L 29/06 (2006.01)
H04W 88/10 (2009.01)
(Continued)

(52) U.S. Cl.
CPC ............. *H04W 88/10* (2013.01); *H04W 4/80* (2018.02); *H04W 12/068* (2021.01);
(Continued)

(58) Field of Classification Search
CPC ....... H04W 88/10; H04W 76/14; H04W 4/80; H04W 12/0608
See application file for complete search history.

(56) References Cited

U.S. PATENT DOCUMENTS 8,587,454 B1 * 11/2013 Dearworth ........... G07B 15/063
340/928
9,693,377 B2    6/2017 Gulliksson
(Continued)

FOREIGN PATENT DOCUMENTS

CN    103297467 A    9/2013
CN    104052682 A    9/2014
(Continued)

*Primary Examiner* — Jeffrey C Pwu
*Assistant Examiner* — Rodman Alexander Mahmoudi
(74) *Attorney, Agent, or Firm* — Kirton McConkie; Evan R. Witt

(57) ABSTRACT

Disclosed are a network sharing method, a network accessing method and a system. The network sharing method comprises: detecting whether a terminal device enables a WiFi function as receiving a WiFi hotspot creating operation; creating a virtual WiFi hotspot configured with preset hotspot name and password through a Bluetooth Generic Attribute (GATT) as detecting that the WiFi function is enabled; and establishing a Bluetooth PAN connection with an access terminal through the virtual WiFi hotspot to achieve network sharing.

6 Claims, 6 Drawing Sheets

(51) Int. Cl.
*H04W 76/14* (2018.01)
*H04W 88/04* (2009.01)
*H04W 4/80* (2018.01)
*H04W 12/50* (2021.01)
*H04W 12/06* (2021.01)
*H04W 84/12* (2009.01)

(52) U.S. Cl.
CPC ........... *H04W 12/50* (2021.01); *H04W 76/14* (2018.02); *H04W 88/04* (2013.01); *H04W 84/12* (2013.01)

(56) References Cited

U.S. PATENT DOCUMENTS

| | | |
|---|---|---|
| 10,021,732 B2 | 7/2018 | Huang et al. |
| 2011/0225264 A1* | 9/2011 | Serar .................. G06Q 20/3255 709/217 |
| 2013/0182693 A1 | 7/2013 | Sperling |
| 2013/0183935 A1* | 7/2013 | Holostov .............. H04W 36/22 455/411 |
| 2014/0289825 A1 | 9/2014 | Chan et al. |
| 2015/0003432 A1 | 1/2015 | Tanaka |
| 2015/0327069 A1* | 11/2015 | Fu .......................... H04W 12/06 726/5 |
| 2016/0100356 A1* | 4/2016 | Liu ....................... H04W 48/18 370/329 |
| 2016/0277928 A1* | 9/2016 | Yue ....................... H04W 12/06 |
| 2016/0373594 A1* | 12/2016 | Kurihara .............. H04N 1/4413 |
| 2018/0295660 A1* | 10/2018 | Choi ..................... H04W 76/14 |

FOREIGN PATENT DOCUMENTS

| | | |
|---|---|---|
| CN | 105188013 A | 12/2015 |
| CN | 106535092 A | 3/2017 |
| EP | 3080704 A1 | 10/2016 |

* cited by examiner

NETWORK SHARING METHOD, NETWORK ACCESSING METHOD AND SYSTEM

TECHNICAL FIELD OF THE INVENTION

The present invention relates to an intelligent terminal field, and more particularly to a network sharing method, a network accessing method and a system.

BACKGROUND OF THE INVENTION

Currently, there are two wireless solutions for smart terminals, namely Wireless Fidelity (WiFi) and WiFi hotspots, also called virtual wireless access point (SOPFTAP). In the existing wireless solution of the smart terminal, the WiFi and the WiFi hotspot are mutually exclusive functions. Namely, the WiFi hotspot function is automatically disabled when the WiFi function is enabled. Then, when the WiFi function is enabled and the user wants to share the network with others, it needs to enable a Bluetooth network sharing function; and the access terminal needs to enable the Bluetooth to enter a Bluetooth control search interface for searching and selecting a corresponding device to match, and then a Bluetooth PAN connection is established after the match is successful. However, the network sharing process is cumbersome and requires a large number of operations by the user, which brings inconvenience to the user.

SUMMARY OF THE INVENTION

The embodiment of the invention provides a network sharing method, a network accessing method and a system, which can enable a WiFi network and a WiFi hotspot to be simultaneously used, and can share a network through a WiFi hotspot to meet the user's demand for network sharing.

For solving the aforesaid technical issue, the technical solution employed by the present invention is:

a network sharing method, comprising:

detecting whether a terminal device enables a Wireless Fidelity (WiFi) function as receiving a hotspot creating operation;

creating a simulated WiFi hotspot configured with preset hotspot name and password through a Bluetooth Generic Attribute (GATT) as detecting that the WiFi function is enabled; and establishing a Bluetooth Personal Area Networking (PAN) connection with an access terminal through the simulated WiFi hotspot to achieve network sharing.

In the network sharing method, the step of establishing the Bluetooth Personal Area Networking (PAN) connection with the access terminal through the simulated WiFi hotspot to achieve network sharing comprises:

receiving a connection request for establishing the Bluetooth PAN connection sent by the access terminal to the terminal device through the virtual WiFi hotspot, wherein the connection request carries a Bluetooth Media Access Control (MAC) address of the access terminal;

parsing the connection request and verifying a validity of the Bluetooth MAC address; and allowing the connection request and establishing the Bluetooth PAN connection with the access terminal to achieve network sharing when the Bluetooth MAC address is valid.

In the network sharing method, the step of receiving the connection request for establishing the Bluetooth PAN connection sent by the access terminal to the terminal device through the virtual WiFi hotspot, wherein the connection request carries the Bluetooth Media Access Control (MAC) address of the access terminal, further comprises:

receiving an accessing request sent by the access terminal through the virtual WiFi hotspot to the terminal device, wherein the accessing request carries a first password;

establishing a Bluetooth GATT connection with the access terminal according to the accessing request, and reading and verifying a validity of the first password; and the terminal device setting the Bluetooth MAC address of the access terminal as a valid address, and feeding back information of successful verification to the access terminal when the verification is successful.

In the network sharing method, the step of establishing the Bluetooth GATT connection with the access terminal according to the accessing request, and reading and verifying the validity of the first password, further comprises:

clearing the first password, and writing correct information of the first password into the first password to inform the access terminal incorrect password when the verification fails.

In the network sharing method, the step of detecting whether the terminal device enables the WiFi function as receiving the hotspot creating operation comprises:

prompting a user to input a name and a password of the WiFi hotspot as receiving a WiFi hotspot creating operation of the user;

receiving the name and the password of the WiFi hotspot input by the user, and saving the same as the preset hotspot name and password; and detecting whether the terminal device enables the WiFi function.

A network sharing system, comprising:

one or more processors;

a memory; and one or more application programs, wherein the one or more application programs are stored in the memory and executed by the processor; and the one or more application programs comprises:

a detecting module, detecting whether a terminal device enables a Wireless Fidelity (WiFi) function as receiving a hotspot creating operation;

a creating module, creating a simulated WiFi hotspot configured with preset hotspot name and password through a Bluetooth Generic Attribute (GATT) as detecting that the WiFi function is enabled; and a first establishing module, establishing a Bluetooth Personal Area Networking (PAN) connection with an access terminal through the simulated WiFi hotspot to achieve network sharing.

In the network sharing system, the first establishing module specifically comprises:

a first receiving unit, receiving a connection request for establishing the Bluetooth PAN connection sent by the access terminal to the terminal device through the virtual WiFi hotspot, wherein the connection request carries a Bluetooth Media Access Control (MAC) address of the access terminal;

a first verifying unit, parsing the connection request and verifying a validity of the Bluetooth MAC address; and a first establishing unit, allowing the connection request and establishing the Bluetooth PAN connection with the access terminal to achieve network sharing when the Bluetooth MAC address is valid.

In the network sharing system, the first establishing module further comprises:

a second receiving unit, receiving an accessing request sent by the access terminal through the virtual WiFi hotspot to the terminal device, wherein the accessing request carries a first password;

a second verifying unit, establishing a Bluetooth GATT connection with the access terminal according to the accessing request, and reading and verifying a validity of the first password; and a feeding back unit, feeding back information of successful verification to the access terminal when the verification is successful and the terminal device sets the Bluetooth MAC address of the access terminal as a valid address.

In the network sharing system, the feeding back module unit is further for:

clearing the first password, and writing correct information of the first password into the first password to inform the access terminal incorrect password when the verification fails.

In the network sharing system, the detecting module unit is further for:

prompting a user to input a name and a password of the WiFi hotspot as receiving a WiFi hotspot creating operation of the user;

receiving the name and the password of the WiFi hotspot input by the user, and saving the same as the preset hotspot name and password; and detecting whether the terminal device enables the WiFi function.

A network accessing system, comprising:
one or more processors;
a memory; and
one or more application programs, wherein the one or more application programs are stored in the memory and executed by the processor; and the one or more application programs comprises:

a determining module, determining a type of a WiFi hotspot when searching for the WiFi hotspot, wherein the type of the WiFi hotspot comprises a virtual WiFi hotspot and a WiFi hotspot;

a second establishing module, establishing a Bluetooth GATT with a hotspot terminal corresponding to the WiFi hotspot when a network hotspot is the virtual WiFi hotspot; and a third establishing module, obtaining a second Bluetooth MAC address of the hotspot terminal through the Bluetooth GATT connection, and establishing a Bluetooth PAN connection with the hotspot terminal through the MAC address.

In the network accessing system, the third establishing module unit comprises:

a sending unit, sending a preset second password to the hotspot terminal corresponding to the virtual WiFi hotspot through Bluetooth GATT;

a reading unit, reading a verification result of the second password through the Bluetooth GATT, and reading a Bluetooth MAC address of the hotspot terminal through the Bluetooth GATT when the result is successful; and a second establishing unit, establishing the Bluetooth PAN connection with the hotspot terminal according to the MAC address.

In the network accessing system, the reading unit is further configured to disconnect the Bluetooth GATT connection when the password is incorrect, and to prompt a user that the password is incorrect.

The benefits of the present application are: compared with the prior art, the present invention provides a network sharing method, a network accessing method and a system. The network sharing method comprises: detecting whether a terminal device enables a WiFi function as receiving a WiFi hotspot creating operation; creating a virtual WiFi hotspot configured with preset hotspot name and password through a Bluetooth Generic Attribute (GATT) as detecting that the WiFi function is enabled; and establishing a Bluetooth PAN connection with an access terminal through the virtual WiFi hotspot to achieve network sharing. In the present invention, by creating the virtual WiFi hotspot through the Bluetooth GATT when the WiFi function is enabled, and establishing a connection with the access terminal through simulated WiFi and the Bluetooth PAN, the network is shared to the access terminal, thereby solving problem that the WiFi function and the WiFi hotspot are mutually exclusive in the existing wireless solution, and the user's demand for network sharing is satisfied.

DETAILED DESCRIPTION OF THE INVENTION

The present invention provides a network sharing method, a network accessing method and a system. For the purpose, technical solutions and advantages of the present invention will become clear, unambiguous, embodiments of the present invention is described in further detail below with reference to the accompanying drawings simultaneously. It should be understood that the specific embodiments described herein are merely for explaining the present invention and are not intended to limit the present invention.

In the present invention, the use of suffixes, such as "module", "component" or "unit" for indicating an element is merely an explanation for facilitating the present invention, and does not have a specific meaning per se. Thus, "module", "component" or "unit" can be used, alternately for one another.

The terminal device can be implemented in various forms. For example, the terminals described in the present invention may include, a mobile terminal, such as a mobile phone, a smart phone, a notebook computer, a digital broadcast receiver, a PDA (Personal Digital Assistant), a PAD (Tablet), a PMP (Portable Multimedia Player) and a navigation device and a fixed terminal, such as digital television and a desktop computer for illustration. However, those skilled in the art will appreciate that configurations in accordance with embodiments of the present invention can be applied to fixed type terminals in addition to components that are specifically for mobile purposes.

The content of the invention will be further described by the following description of embodiments with reference to the accompanying drawings.

Figure 1:
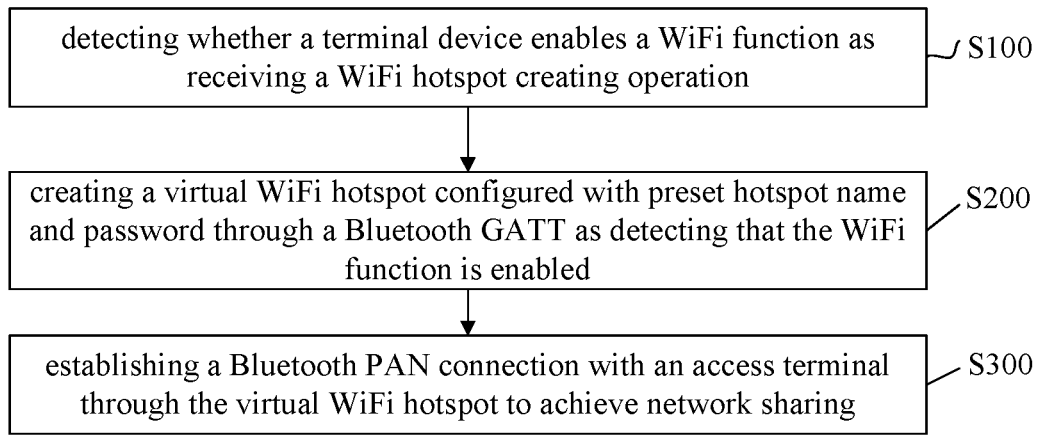
FIG. 1 is a flowchart of a preferred embodiment of a network sharing method provided by the present invention.

Please refer to FIG. 1. FIG. 1 is a flowchart of a preferred embodiment of a network sharing method provided by the present invention. The method comprises:

S100, detecting whether a terminal device enables a Wireless Fidelity (WiFi) function as receiving a WiFi hotspot creating operation.

Specifically, receiving the WiFi hotspot creating operation refers to receiving the operation of the user to enable the hotspot function through the setting interface of the terminal device. That is, the WiFi hotspot creating operation by a user is received, wherein the WiFi hotspot network is a network established for sharing a network with other terminals.

detecting whether the terminal device enables the WiFi function refers to determining whether the terminal device enables the WiFi function, that is, determining whether the terminal device is connected to the wireless network through a connection router. In the practical application, detecting whether the terminal device enables the WiFi function can be implemented by detecting the state of the WiFi function key of the terminal device. When the WiFi function key is in the on state, it is determined that the terminal device enables the WiFi function; when the WiFi function key is in the off state, it is determined that the terminal device does not enable the WiFi function.

Illustratively, the step of detecting whether a terminal device enables the Wireless Fidelity (WiFi) function as receiving the WiFi hotspot creating operation can specifically comprise:

S101, prompting a user to input a name and a password of the WiFi hotspot as receiving a WiFi hotspot creating operation of the user;

S102, receiving the name and the password of the WiFi hotspot input by the user, and saving the same as the preset hotspot name and password; and

S103, detecting whether the terminal device enables the WiFi function.

Specifically, the configuration item of the WiFi hotspot is preset in the setting interface of the terminal device, and the user controls the on/off of the WiFi hotspot by controlling the on/off of the configuration item. Here, receiving a WiFi hotspot creating operation of the user described herein refers to that the user controls the WiFi hotspot function to be enabled through the configuration item. When the WiFi hotspot function is enabled, the terminal device will promote the user to input the name and the password of the pr-created WiFi hotspot. In the practical application, the name and password of the WiFi hotspot may also be automatically generated by the system when the configuration item is enabled, or may be the name and password used when the WiFi hotspot is previously enabled.

Furthermore, in order to facilitate the convenient WiFi hotspot creating operation of the user, when the name and password of the WiFi hotspot input by the user are received, the name and the password are saved as common items in the terminal device, so that the user can use it for creating the WiFi hotspot again. Certainly, when receiving the name and password of the WiFi hotspot input by the user, it may also determine whether the name and password of the WiFi hotspot have been saved in the terminal device, and if it has been saved, the saved name and password of the WiFi hotspot are replaced with the currently received name and password. This can ensure the latestness of the name and password of the saved WiFi hotspot, and bring convenience to the user.

S200, creating a virtual WiFi hotspot configured with preset hotspot name and password through a Bluetooth Generic Attribute (GATT) as detecting that the WiFi function is enabled.

Specifically, the Bluetooth GATT (Generic Attribute Protocol) is a Bluetooth universal attribute protocol, which defines a multi-layer data structure for implementing communication between Bluetooth low-power devices. The Bluetooth GATT includes two roles, a server terminal (server) and an access terminal (client). The server may create a plurality of services, and the service may include a plurality of characteristics, and the characteristic may include each feature including a property and a value, and may also include a plurality of descriptions. In this embodiment, the characteristic includes a plurality of descriptions. The data interaction between the server and the client is achieved by reading/writing the characteristic and descriptions of the server.

Figure 2:
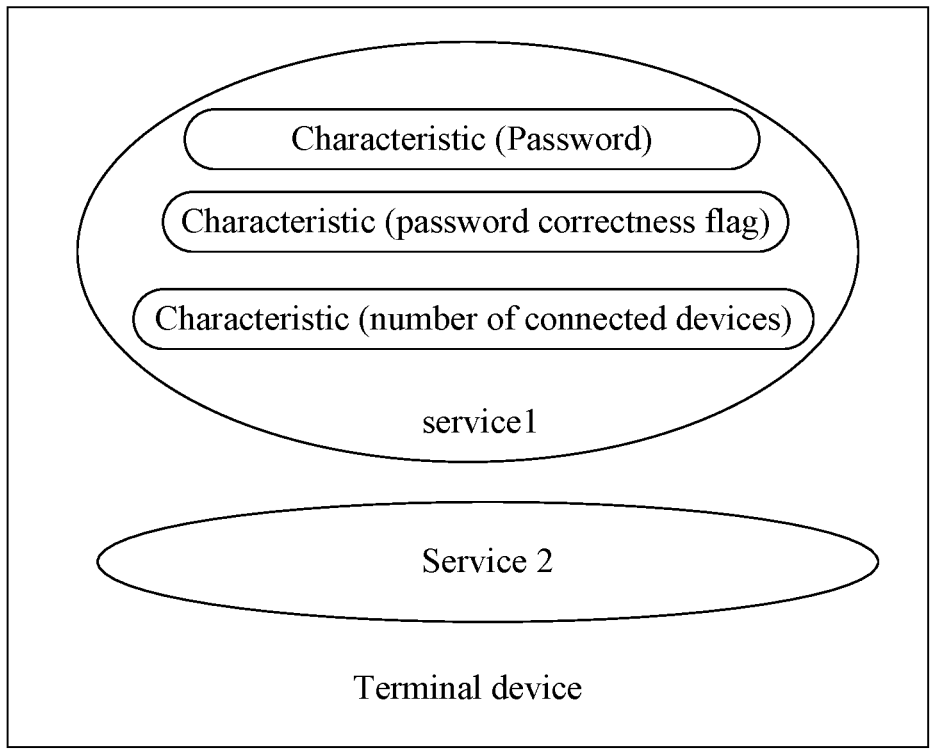
FIG. 2 is a principle diagram of establishing a virtual WiFi hotspot by an intelligent terminal in a network sharing method provided by the present invention.

In this embodiment, as shown in FIG. 2, the terminal device (referred to as the hotspot terminal (Hotspot)) is a server end, which uses the GATT to generate a plurality of virtual WiFi hotspots (services), which can be respectively recorded as service1, service2, and etc. Each service contains a Characteristic (Password), a Characteristic (password correctness flag) and Characteristic (number of connected devices). The other device that needs to connect to the virtual WiFi hotspot is used as an access terminal (client terminal), and uses GATT to implement filtering and processing of low-power Bluetooth signals to search for the virtual WiFi hotspot. The virtual WiFi hotspot possesses a preset hotspot name and password. Namely, the virtual WiFi hotspot possesses the same name and password as the WiFi hotspot created when the WiFi function is not activated. The preset hotspot name and password are the hotspot name and password configured when the WiFi hotspot is created. For instance, the name is admin and the password is 123.

S300, establishing a Bluetooth Personal Area Networking (PAN) connection with an access terminal through the virtual WiFi hotspot to achieve network sharing.

Specifically, the Bluetooth PAN is a technology for implementing a personal area network through Bluetooth. When establishing a Bluetooth PAN connection, the two roles are NAP and PANU, respectively, wherein the NAP is a hotspot terminal, and the PANU is a hotspot access terminal. In this embodiment, the NAP (hotspot) is the terminal device, and the PANU (hotspot access terminal) is another device that is to access the WiFi hotspot of the terminal device, i.e., the access terminal.

Figure 3:
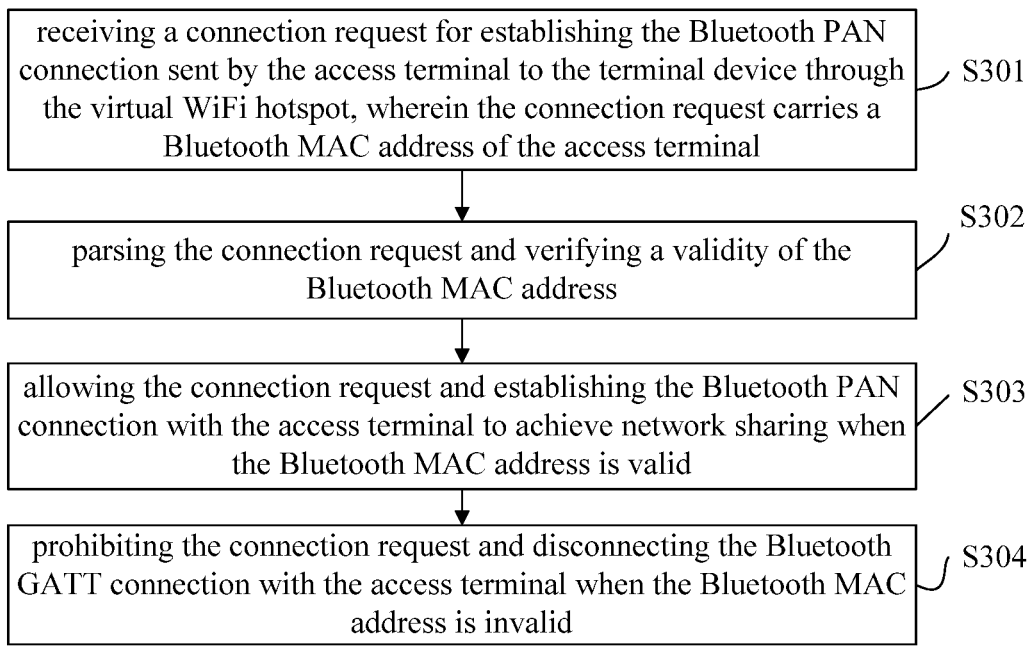
FIG. 3 is a flowchart of establishing a Bluetooth PAN connection in a network sharing method provided by the present invention.

Illustratively, as shown in FIG. 3, a step of establishing the Bluetooth Personal Area Networking (PAN) connection with the access terminal through the virtual WiFi hotspot to achieve network sharing comprises:

S301, receiving a connection request for establishing the Bluetooth PAN connection sent by the access terminal to the terminal device through the virtual WiFi hotspot, wherein the connection request carries a Bluetooth Media Access Control (MAC) address of the access terminal;

S302, parsing the connection request and verifying a validity of the Bluetooth MAC address;

S303, allowing the connection request and establishing the Bluetooth PAN connection with the access terminal to achieve network sharing when the Bluetooth MAC address is valid; and S304, prohibiting the connection request and disconnecting the Bluetooth GATT connection with the access terminal when the Bluetooth MAC address is invalid.

Specifically, in Step S301, the accessing request is an accessing request sent by the access terminal to the terminal device through a reflection mechanism, and the access terminal sends the MAC address thereof to the terminal device, such that the terminal device can verify the access terminal through the MAC address.

In Step S302, verifying the validity of the Bluetooth MAC address means that the MAC address will be queried in the preset Bluetooth MAC address list. If the query is successful, the verification succeeds; if not, the verification fails. The preset Bluetooth MAC address list is used to save the MAC addresses of other devices trusted by the terminal device. By verifying the Bluetooth MAC address, it can avoid that the hacker obtains the password of the WiFi hotspot by stealing the password, and can avoid maliciously wasting the data flow of the terminal device, and causing property loss to the user of the terminal. Thereby, the security of network sharing is further enhanced.

In Step S303, when the Bluetooth MAC address is valid, the access terminal may establish a Bluetooth PAN connection with the terminal device, and share the network of the terminal device through the virtual WiFi hotspot.

In Step S304, when the Bluetooth MAC address is invalid, the access terminal may not establish a Bluetooth PAN connection with the terminal device. At this time, the Bluetooth GATT connection between the access terminal and the terminal device is disconnected to avoid resource waste of the terminal device.

In this embodiment, since the virtual WiFi hotspot is configured with a password, a password verification process needs to be included before the access terminal establishes a Bluetooth PAN connection with the terminal device. before configuring the password verification process and receiving the accessing request for establishing the Bluetooth PAN connection sent by the access terminal to the terminal device through the virtual WiFi hotspot, the method specifically comprises:

receiving an accessing request sent by the access terminal through the virtual WiFi hotspot to the terminal device, wherein the accessing request carries a first password;

establishing a Bluetooth GATT connection with the access terminal according to the accessing request, and reading and verifying a validity of the first password; and the terminal device setting the Bluetooth MAC address of the access terminal as a valid address, and feeding back information of successful verification to the access terminal when the verification is successful.

In this embodiment, when the access terminal is to be connected to the terminal device through the WiFi hotspot, it first sends a request for establishing a connection of the Bluetooth GATT to the terminal device, and then reads the accessing request to carry the first password, that is, reads the characteristic (password), the read password is compared with its preset password, and if the password is correct, the access terminal is marked as a security device. Namely, the Bluetooth MAC address of the access terminal is saved to the preset Bluetooth MAC address list, and the validity of the Bluetooth MAC address of the access terminal is verified for subsequent Bluetooth PAN connection. This embodiment enhances the restriction on the access terminal by verifying the password carried by the access terminal, thereby improving the security of the network sharing.

Figure 4:
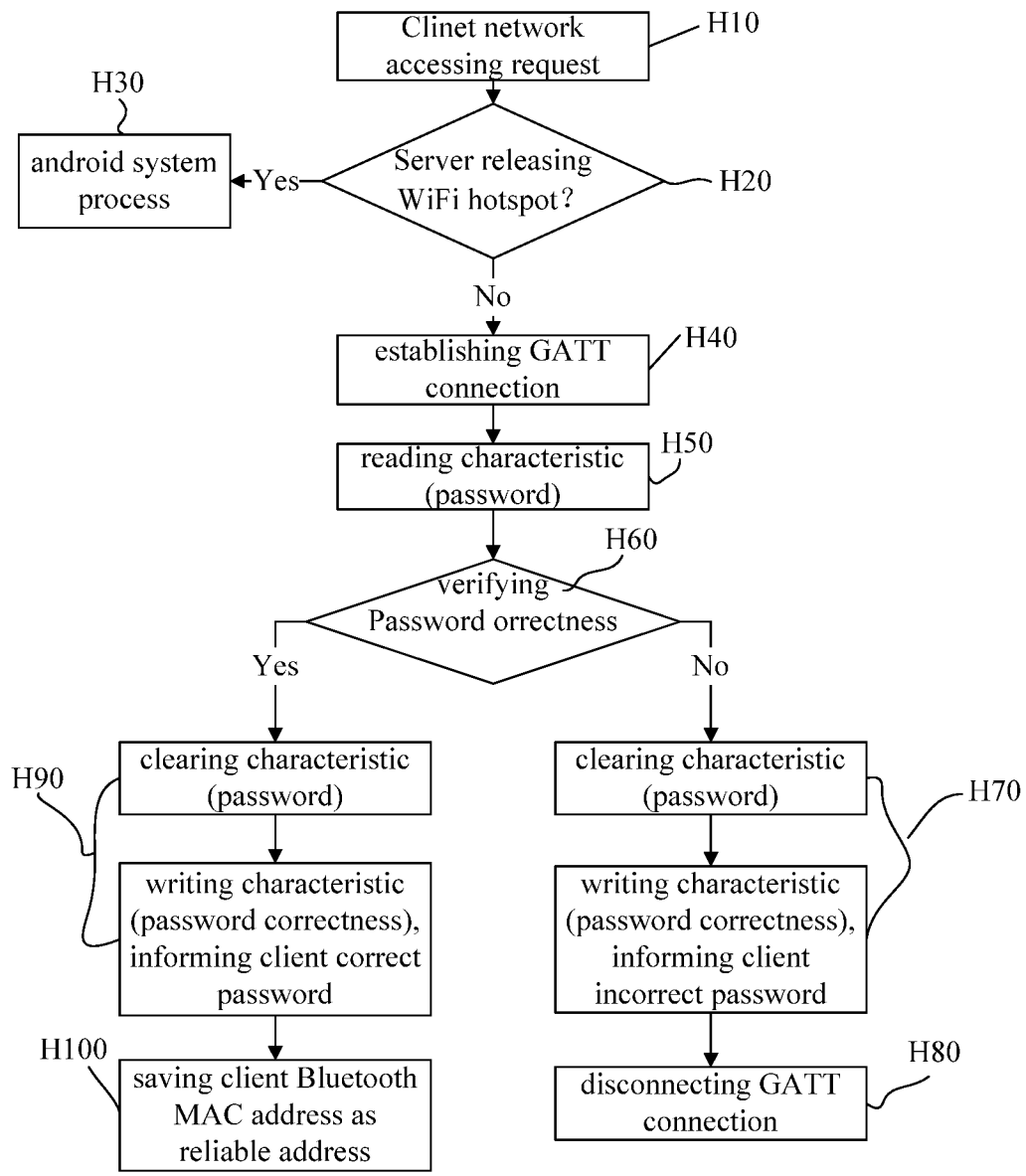
FIG. 4 is a flowchart of password verification in a network sharing method provided by the present invention.

In an embodiment of the present invention, as shown in FIG. 4, the password verification process may specifically include:

H10, receiving an accessing request of the access terminal, wherein the accessing request carries a first password;

H20, determining the type of the WiFi hotspot that is released by itself, as it is a WiFi hotspot, performing step H30, and as it is a virtual WiFi hotspot, performing step H40;

H30, establishing a connection through the WiFi hotspot and ending the operation.

H40, connecting to the access terminal through Bluetooth GATT;

H50, reading a characteristic (password), wherein the characteristic (write) writes the accessing request to carry a first password;

H60, verifying the correctness of the first password, as it is incorrect, performing Step H70, and as it is correct, performing Step H90;

H70, clearing the characteristic (password), and writing the password error information into the characteristic (password) to inform the access terminal incorrect password;

H80, disconnecting to the Bluetooth GATT connection;

H90, clearing the characteristic (password), and writing the password correct information into the characteristic (password) to inform the access terminal correct password;

H100, saving the Bluetooth MAC address of the access terminal as a reliable address.

Specifically, in Step H30, when the WiFi hotspot is used, the existing WiFi hotspot processing method is used to establish the connection with the access terminal to achieve network sharing, and the corresponding system adopts the prior art for the connection to the WiFi hotspot, and will not be repeated here.

In one embodiment of the present invention, the network sharing method can further comprise:

S400, creating a WiFi hotspot with preset hotspot name and password to achieve network sharing when the WiFi function is not enabled; and S500, establishing a connection with an access terminal through the WiFi hotspot to achieve network sharing.

Specifically, when it is detected that the WiFi function is not enabled, the WiFi hotspot configured with the preset hotspot name and password is directly created through the existing wireless solution, and network sharing is implemented by using the WiFi hotspot.

Figure 5:
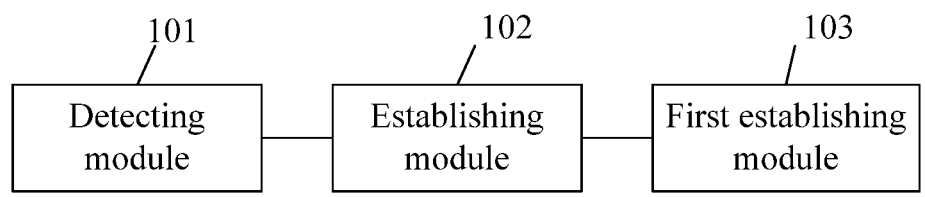
FIG. 5 is a structural diagram of a network sharing system provided by the present invention.

The invention further provides a network sharing system, as shown in FIG. 5, which comprises:

a detecting module 101, detecting whether a terminal device enables a Wireless Fidelity (WiFi) function as receiving a hotspot creating operation;

a creating module 102, creating a simulated WiFi hotspot configured with preset hotspot name and password through a Bluetooth Generic Attribute (GATT) as detecting that the WiFi function is enabled; and a first establishing module 103, establishing a Bluetooth Personal Area Networking (PAN) connection with an access terminal through the simulated WiFi hotspot to achieve network sharing.

In the network sharing system, the first establishing module specifically comprises:

a first receiving unit, receiving a connection request for establishing the Bluetooth PAN connection sent by the access terminal to the terminal device through the virtual WiFi hotspot, wherein the connection request carries a Bluetooth Media Access Control (MAC) address of the access terminal;

a first verifying unit, parsing the connection request and verifying a validity of the Bluetooth MAC address; and a first establishing unit, allowing the connection request and establishing the Bluetooth PAN connection with the access terminal to achieve network sharing when the Bluetooth MAC address is valid.

In the network sharing system, the first establishing module further comprises:

a second receiving unit, receiving an accessing request sent by the access terminal through the virtual WiFi hotspot to the terminal device, wherein the accessing request carries a first password;

a second verifying unit, establishing a Bluetooth GATT connection with the access terminal according to the accessing request, and reading and verifying a validity of the first password; and a feeding back unit, feeding back information of successful verification to the access terminal when the verification is successful and the terminal device sets the Bluetooth MAC address of the access terminal as a valid address.

Figure 6:
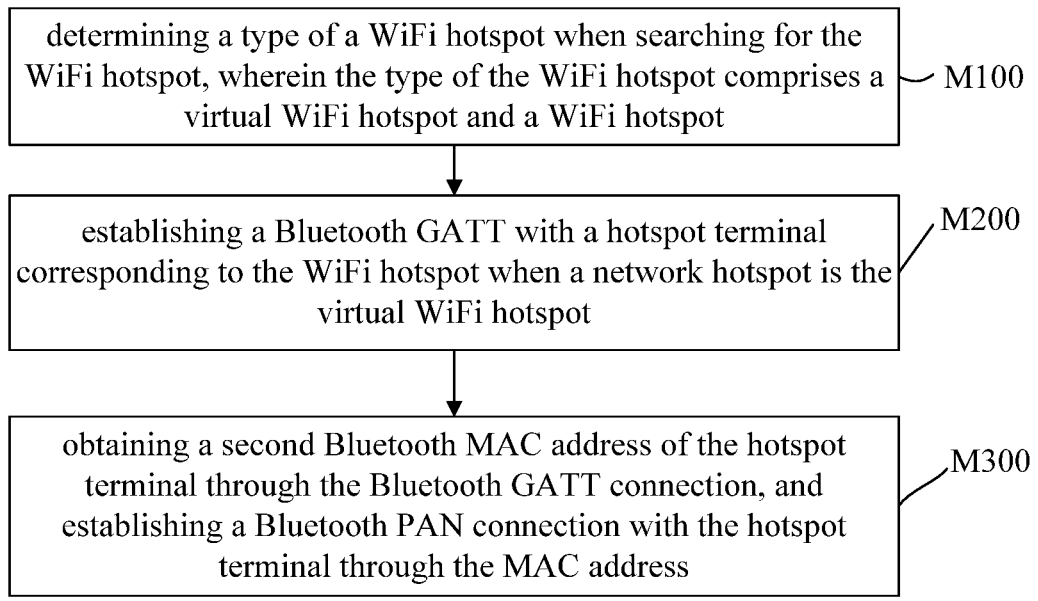
FIG. 6 is a flowchart of a preferred embodiment of a network accessing method provided by the present invention.

The invention further provides a network accessing method, as shown in FIG. 6, which comprises:

M100, determining a type of a WiFi hotspot when searching for the WiFi hotspot, wherein the type of the WiFi hotspot comprises a virtual WiFi hotspot and a WiFi hotspot;

M200, establishing a Bluetooth GATT with a hotspot terminal corresponding to the WiFi hotspot when a network hotspot is the virtual WiFi hotspot; and M300, obtaining a second Bluetooth MAC address of the hotspot terminal through the Bluetooth GATT connection, and establishing a Bluetooth PAN connection with the hotspot terminal through the MAC address.

In this embodiment, when the virtual WiFi hotspot is found, a Bluetooth GATT connection is established through a shared terminal (referred to as a hotspot terminal) of the Bluetooth GATT and the hotspot, and the Bluetooth MAC address of the hotspot terminal is obtained through the Bluetooth GATT connection, and a Bluetooth PAN connection with the hotspot terminal is established through the Bluetooth MAC address to achieve network accessing.

Specifically, in Step M100, searching for the WiFi hotspot refers to that a WiFi hotspot is searched within a connectable range of the terminal device. When searching for the WiFi hotspot, it is also necessary to determine the availability of the WiFi hotspot. In the practical application, a plurality of WiFi hotspots can be searched in the connectable range of the terminal device, and the searched WiFi hotspot can be saved in the WiFi hotspot list, and the WiFi hotspot list is displayed to the user, and then, the WiFi hotspot that need to be connected is determined according to the user's choice. Certainly, after searching for the WiFi hotspot, the using number of each WiFi hotspot may be determined, and the WiFi hotspot to be connected is determined according to the using numbers.

Furthermore, when the WiFi hotspot is searched, the availability of the WiFi hotspot may be determined, and the unavailable WiFi hotspot may be directly filtered, so that the success rate of the WiFi hotspot connection can be improved. The step of determining the type of the WiFi hotspot when searching for the WiFi hotspot, wherein the type of the WiFi hotspot comprises the virtual WiFi hotspot and the WiFi hotspot can specifically comprises:

M101, searching all the hotspots in the connectable range of the terminal device, and determining whether the hotspot is a WiFi hotspot, wherein the WiFi hotspot includes a virtual WiFi hotspot and a WiFi hotspot;

M102, adding all the hotspots which are WiFi hotspots to the hotspot list, and determining the type of WiFi hotspot from the hotspot list, wherein the types of the WiFi hotspot comprises a virtual WiFi hotspot and a WiFi hotspot;

M103, blocking all wireless signals that are not WiFi hotspots.

In Step M200, the terminal device needs to receive a second password input by the user before the hotspot terminal corresponding to the WiFi hotspot establishes a Bluetooth GATT, so that as the terminal device establishes a GATT connection with the hotspot terminal, the second password is written into the option of the virtual hotspot of the hotspot terminal.

In Step M300, a step of obtaining the second Bluetooth MAC address of the hotspot terminal through the Bluetooth GATT connection, and establishing the Bluetooth PAN connection with the hotspot terminal through the MAC address can specifically comprises:

M301, sending a preset second password to the hotspot terminal corresponding to the virtual WiFi hotspot through Bluetooth GATT.

Specifically, sending a preset second password to the hotspot terminal corresponding to the virtual WiFi hotspot through Bluetooth GATT refers to writing the second password into the option of the characteristic (password) of the virtual hotspot of the hotspot terminal, so that the hotspot terminal can read the second password and verify the second password; if the password is correct, the hotspot terminal will write 0x01 in the characteristic (password correctness flag) and 0x02 if it is incorrect.

M302, reading a verification result of the second password through the Bluetooth GATT, and reading a Bluetooth MAC address of the hotspot terminal through the Bluetooth GATT when the result is successful; and Specifically, the terminal device reads the characteristic (password correctness flag), and if 0x01 is obtained (indicating that the password is correct), the Bluetooth MAC address of the hotspot terminal is read. In practical application, it can be achieved through the BluetoothAdapter.getProfileProxy(context, BluetoothProfile.ServiceListener, BluetoothProfile_PAN) to obtain the proxy of the Bluetooth PAN. The proxy of the Bluetooth PAN can also be obtained through the following two methods in the ServiceListener:

public void onServiceDisconnected(int profile); and public void onServiceConnected(int profile,BluetoothProfile proxy)

With the onServiceConnected method, the Bluetooth PAN related method can be obtained through the JAVA reflection mechanism.

Specifically, the method for reading the Bluetooth MAC address of the hotspot terminal is known in the prior art and will not be described in detail herein.

M303, establishing the Bluetooth PAN connection with the hotspot terminal according to the MAC address.

Specifically, after the MAC address is obtained, the connection is established with the hotspot terminal according to the MAC address. Of course, if 0x02 (the password is incorrect) is obtained, the password error hint is prompted, and then to disconnect the GATT. In this embodiment, the two methods of "connect" and "disconnect" are adopted, and the PAN connection can be established with the target device through "connect", and the PAN connection can be disconnected from the target device through "disconnect".

Figure 7:
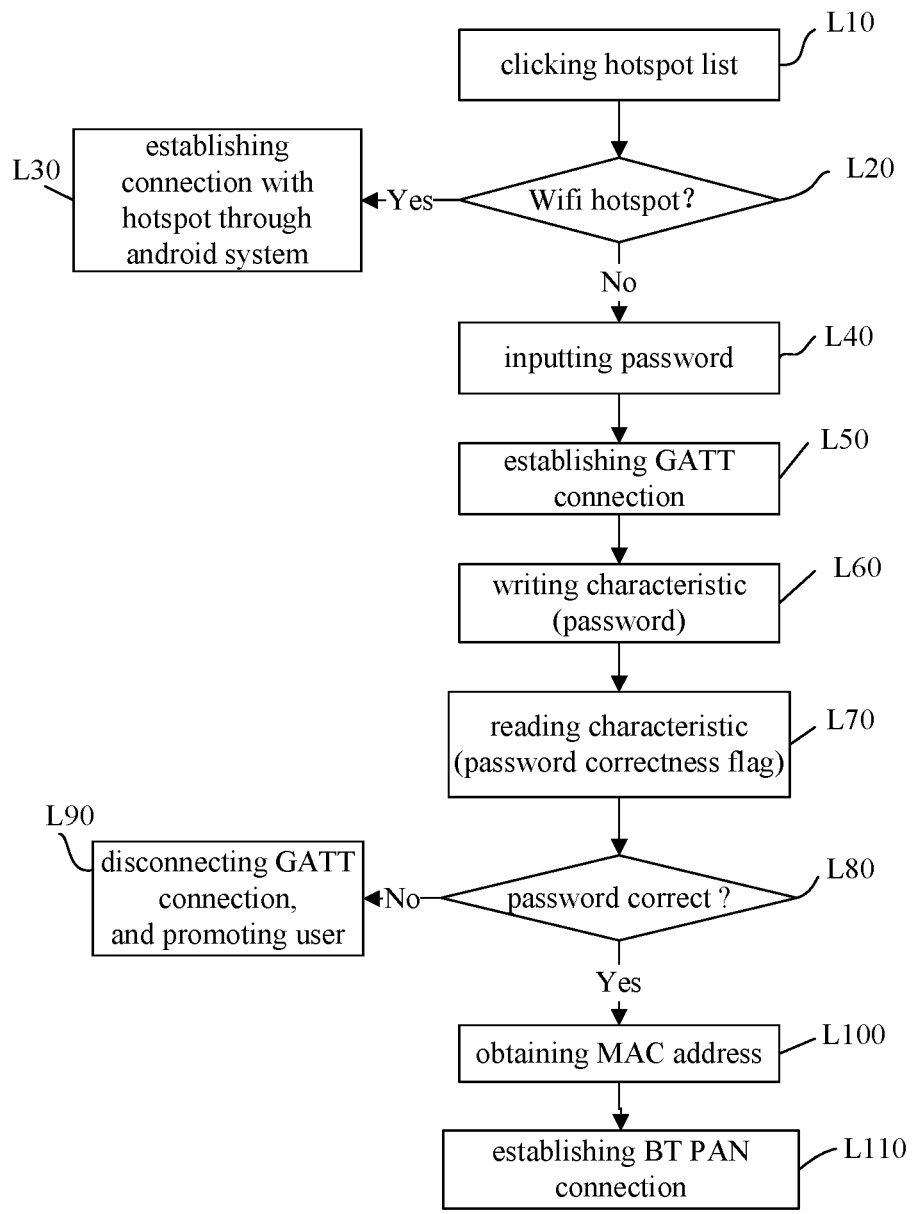
FIG. 7 is a flowchart of an embodiment of a network accessing method provided by the present invention.

In an embodiment of the present invention, as shown in FIG. 7, the network accessing method may specifically include:

L10, clicking the preset hotspot list to select the hotspot to be connected;

L20, determining the type of WiFi hotspot, if it is a WiFi hotspot, executing Step L30, if it is a virtual WiFi hotspot, executing Step L40;

L30, establishing a connection with the hotspot through the system;

L40, receive a second password inputted by a user;

L50, establishing a GATT connection with the hotspot terminal corresponding to the hotspot;

L60, writing the second password into the characteristic item of the hotspot;

L70, reading the characteristic (password correctness flag) item of the hotspot;

L80, determining the correctness of the second password according to the read result, and when the password is incorrect, performing Step L90, and when the password is correct, performing Step L100;

L90, disconnecting the Bluetooth GATT connection, and prompting the user incorrect password;

L100, obtaining a Bluetooth MAC address of the hotspot terminal through the Bluetooth GATT connection;

L110, establishing a Bluetooth PAN connection with the hotspot terminal according to the MAC address of the hotspot terminal.

Figure 8:
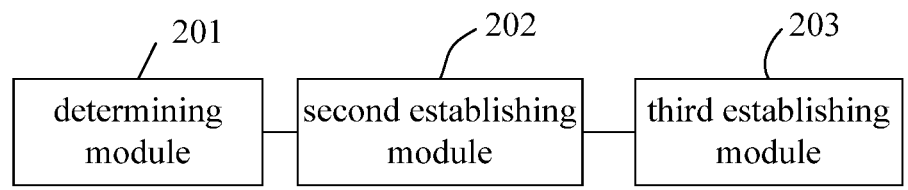
FIG. 8 is a structural diagram of a network accessing system provided by the present invention.

The invention further provides a network accessing system, as shown in FIG. 8, which comprises:

a determining module 201, determining a type of a WiFi hotspot when searching for the WiFi hotspot, wherein the type of the WiFi hotspot comprises a virtual WiFi hotspot and a WiFi hotspot;

a second establishing module 202, establishing a Bluetooth GATT with a hotspot terminal corresponding to the WiFi hotspot when a network hotspot is the virtual WiFi hotspot; and a third establishing module 203, obtaining a second Bluetooth MAC address of the hotspot terminal through the Bluetooth GATT connection, and establishing a Bluetooth PAN connection with the hotspot terminal through the MAC address.

In the network accessing system, the third establishing module unit specifically comprises:

a sending unit, sending a preset second password to the hotspot terminal corresponding to the virtual WiFi hotspot through Bluetooth GATT;

a reading unit, reading a verification result of the second password through the Bluetooth GATT, and reading a Bluetooth MAC address of the hotspot terminal through the Bluetooth GATT when the result is successful; and a second establishing unit, establishing the Bluetooth PAN connection with the hotspot terminal according to the MAC address.

In order to further illustrate the network sharing method and the network accessing method provided by the present invention, a pseudo code implementation of the key technology is given below for ease of understanding.

The pseudo code implementation of the key technology can be specifically as follows:

```
First, establishing a wifi hotspot
    public Boolean createHotspot(String hotspotName,String hotspotPsd,WifiUtil wifiUtil){
        if(wifi function is not turned on){
            try {
                //setting wifi hotspot
                    WifiConfiguration wifiConfiguration   = new WifiConfiguration( );
                    wifiConfiguration.SSID = hotspotName;//configured hotspot name
                    wifiConfiguration.preSharedKey = hotspotPsd;//configured hotspot password
                    Method method = WifiManager.class.getMethod("setWifiApEnabled"
                                                ,WifiConfiguration.class,Boolean.TYPE);//obtaining a method to turn on hotspot
                    return (Boolean)method.invoke(mWifiManager,wifiConfiguration,true); //turning on hotspot
            } catch (Exception e) {
                e.printStackTrace( );
                return false;
            }
        }else{
            //configuring BT GATT hotspot
            Boolean result = btGattServer.createBtGattServer(hotspotName,hotspotPsd);
            if(!result){
                return false;
            }
        }
        return true;
    }
Second, scanning and filtering of GATT simulated hotspot signal
    @Override
    public void scanLeDevice(boolean enable) {
        if (enable) {
            // Stops scanning after a pre-defined scan period.
            mHandler.postDelayed(new Runnable( ) {
                @Override
                public void run( ) {
                    mScanning = false;
                    mBluetoothAdapter.stopLeScan(mLeScanCallback);
```

```
                invalidateOptionsMenu( );
            }
        }, SCAN_PERIOD); // SCAN_PERIOD is scan time
        mScanning = true;
        UUID[ ] serviceUuids = new UUID[1];
        //select device with SERVER_SERVICE_HOTSPOT_UUID,
wherein UUID is symbol of simulated hotspot service
        serviceUuids[0] = SERVER_SERVICE_HOTSPOT_UUID;
mBluetoothAdapter.startLeScan(serviceUuids ,mLeScanCallback);
    } else {
        mScanning = false;
        mBluetoothAdapter.stopLeScan(mLeScanCallback);
    }
}
Third, the reflection of the BT PAN connection
private boolean switchPAN(final boolean connect,BluetoothDevice device) {
    final Context context = getApplicationContext( );
if (device == null)
    return false;
    BluetoothAdapter mAdp =
BluetoothAdapter.getDefaultAdapter( );//obtaining a Bluetooth adapter
    //obtaining Bluetooth PAN profile Proxy
        Boolean result = mAdp.getProfileProxy(context,
            new BluetoothProfile.ServiceListener( ) {
            @Override
                public void onServiceDisconnected(int profile) {
            }}
            @Override
            public void onServiceConnected(int profile,
            BluetoothProfile proxy) {
            final Method[ ] methods = methodsOfBluetoothPAN(proxy);
                    if (methods == null)
                    return;
//here is where invoking function implements reflection, connection or
disconnection of BT PAN
            callMethodOfBluetoothPAN(proxy,
                methods[connect ? 0 : 1], device);
            // callMethodOfBluetoothPANBoolean(proxy, methods[3], true);
            }
        }, BluetoothProfile_PAN);
        return true;
    }
    //four methods for obtaining Bluetooth PAN profile by reflection
    private static Method[ ] methodsOfBluetoothPAN(BluetoothProfile btpan)
{
        final Method[ ] methods = new Method[4];
        final Class[ ] params = { BluetoothDevice.class };
        final Class[ ] stateParams = {Boolean.TYPE};
        try {
            methods[0] = btpan.getClass( ).getMethod("connect", params);
            methods[1] = btpan.getClass( ).getMethod("disconnect",
params);
            methods[2] = btpan.getClass( ).getMethod("getConnectionState",
                params);
            methods[3] = btpan.getClass( ).getMethod("isTetheringOn");
        } catch (NoSuchMethodException e) {
            Log.i("btpanswich", "" + e);
            return null;
        }
        return methods;
    }
//invoking method of method obtained by reflection, which contains capture
of exit exception
    private static Object callMethodOfBluetoothPAN(
        final BluetoothProfile proxy, final Method method,
        final BluetoothDevice param) {
    try {
        return method.invoke(proxy, new Object[ ] { param });
    } catch (IllegalArgumentException e) {
        Log.i(TAG, "" + e);
        return null;
    } catch (InvocationTargetException e) {
        Log.i(TAG, "" + e);
        return null;
```

```
    } catch (IllegalAccessException e) {
        Log.i(TAG, "" + e);
        return null;
    }
}.
```

The foregoing various modules of the network sharing method, the network accessing system and the network accessing system have been described in detail in the aforesaid methods, and will not be repeatedly described herein.

Besides, in several embodiments provided by the present invention, it should be understood that the disclosed system and method may be implemented in other ways. As an illustration, the embodiment of the device described above is merely illustrative. For example, the division of the module is only a logical function division and there are additional ways of actual implement, such as, multiple units or components may be combined or can be integrated into another system. Or, some feature can be ignored or not executed. In addition, the coupling, the direct coupling or the communication connection shown or discussed may be either an indirect coupling or a communication connection through some interfaces, devices or units, or may be electrically, mechanically or otherwise connected.

The units described as the separation means may or may not be physically separated. The components shown as units may or may not be physical units, i.e., may be located in one place or may be distributed over a plurality of network units. The part or all of the units can be selected according to the actual demands to achieve the object of the present embodiment.

The respective function units in the respective embodiments of the present invention can be integrated in one process unit, or the individual units are physically present, or two or more units are integrated in one unit. The foregoing integrated units can be implemented in the form of hardware or in the form of a hardware and a software functional unit.

Figure 9:
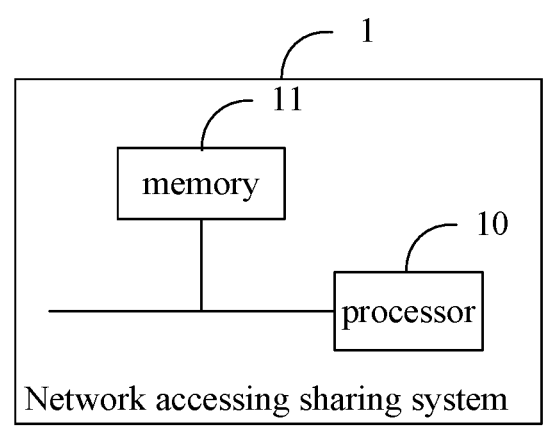
FIG. 9 is a structural diagram of a network accessing system provided by the present invention.

The aforesaid integrated unit implemented in the form of a software functional unit can be stored in a computer readable storage medium. The software functional unit described above is stored in a storage medium and includes instructions for causing a computer device (which may be a personal computer, a server, or a network device, etc.) or a processor to perform some steps of the methods of the various embodiments of the present invention. The foregoing storage medium includes: a U disk, a mobile hard disk, a read-only memory (ROM), a random access memory (RAM), a magnetic disk, or an optical disk, which can store program codes. For instance, as shown in FIG. 9, in the embodiment of the present invention, the system 1 for implementing data security deletion in the mobile terminal includes a processor 10 and a memory 11, and the memory 10 is connected to the processor 11, and the program is stored in the memory 11 and configured to be executed by the processor 10.

It should be noted that the above embodiments are only used to illustrate the technical solutions of the present invention, and are not limited thereto; although the present invention has been described in detail with reference to the foregoing embodiments, those skilled in the art should understand that the technical solutions described in the foregoing embodiments may be modified, or some of the technical features may be equivalently replaced; and the modifications or replacements do not deviate from the spirit and scope of the technical solutions of the embodiments of the present invention.

What is claimed is:

1. A network sharing method, comprising:
   detecting whether a terminal device enables a Wireless Fidelity (WiFi) function as receiving a hotspot creating operation;
   creating a virtual WiFi hotspot configured with preset hotspot name and password through a Bluetooth Generic Attribute (GATT) as detecting that the WiFi function is enabled;
   establishing a Bluetooth Personal Area Networking (PAN) connection with an access terminal through the virtual WiFi hotspot to achieve network sharing;
   creating a WiFi hotspot with preset hotspot name and password to achieve network sharing when the WiFi function is not enabled; and
   establishing a connection with the access terminal through the WiFi hotspot to achieve network sharing,
   wherein the step of establishing the Bluetooth Personal Area Networking (PAN) connection with the access terminal through the virtual WiFi hotspot to achieve network sharing comprises:
   receiving a connection request for establishing the Bluetooth PAN connection sent by the access terminal to the terminal device through the virtual WiFi hotspot, wherein the connection request carries a Bluetooth Media Access Control (MAC) address of the access terminal;
   parsing the connection request and verifying a validity of the Bluetooth MAC address; and
   allowing the connection request and establishing the Bluetooth PAN connection with the access terminal to achieve network sharing when the Bluetooth MAC address is valid,
   wherein the step of receiving the connection request for establishing the Bluetooth PAN connection sent by the access terminal to the terminal device through the virtual WiFi hotspot, wherein the connection request carries the Bluetooth Media Access Control (MAC) address of the access terminal, further comprises:
   receiving an accessing request sent by the access terminal through the virtual WiFi hotspot to the terminal device, wherein the accessing request carries a first password;
   establishing the Bluetooth GATT connection with the access terminal according to the accessing request, and reading and verifying a validity of the first password; and
   the terminal device setting the Bluetooth MAC address of the access terminal as a valid address, and feeding back information of successful verification to the access terminal when the verification is successful.

2. The network sharing method according to claim 1, wherein the step of establishing the Bluetooth GATT connection with the access terminal according to the accessing request, and reading and verifying the validity of the first password, further comprises:

clearing a characteristic, and writing password error information into the characteristic to inform the access terminal incorrect password when the verification fails.

3. The network sharing method according to claim 1, wherein the step of detecting whether the terminal device enables the WiFi function as receiving the hotspot creating operation comprises:

prompting a user to input a name and a password of the WiFi hotspot as receiving a WiFi hotspot creating operation of the user;

receiving the name and the password of the WiFi hotspot input by the user, and saving the same as the preset hotspot name and password; and detecting whether the terminal device enables the WiFi function.

4. A network sharing system, comprising:

one or more processors;

a memory; and one or more application programs, wherein the one or more application programs are stored in the memory and executed by the processor to execute a method comprising:

detecting whether a terminal device enables a Wireless Fidelity (WiFi) function as receiving a hotspot creating operation;

creating a virtual WiFi hotspot configured with preset hotspot name and password through a Bluetooth Generic Attribute (GATT) as detecting that the WiFi function is enabled;

establishing a Bluetooth Personal Area Networking (PAN) connection with an access terminal through the virtual WiFi hotspot to achieve network sharing;

creating a WiFi hotspot with preset hotspot name and password to achieve network sharing when the WiFi function is not enabled; and establishing a connection with the access terminal through the WiFi hotspot to achieve network sharing, wherein the step of establishing the Bluetooth Personal Area Networking (PAN) connection with the access terminal through the virtual WiFi hotspot to achieve network sharing comprises:

receiving a connection request for establishing the Bluetooth PAN connection sent by the access terminal to the terminal device through the virtual WiFi hotspot, wherein the connection request carries a Bluetooth Media Access Control (MAC) address of the access terminal;

parsing the connection request and verifying a validity of the Bluetooth MAC address; and allowing the connection request and establishing the Bluetooth PAN connection with the access terminal to achieve network sharing when the Bluetooth MAC address is valid, wherein the step of receiving the connection request for establishing the Bluetooth PAN connection sent by the access terminal to the terminal device through the virtual WiFi hotspot, wherein the connection request carries the Bluetooth Media Access Control (MAC) address of the access terminal, further comprises:

receiving an accessing request sent by the access terminal through the virtual WiFi hotspot to the terminal device, wherein the accessing request carries a first password;

establishing the Bluetooth GATT connection with the access terminal according to the accessing request, and reading and verifying a validity of the first password; and the terminal device setting the Bluetooth MAC address of the access terminal as a valid address, and feeding back information of successful verification to the access terminal when the verification is successful.

5. The network sharing system according to claim 4, wherein the method further comprises:

clearing a characteristic, and writing password error information into the characteristic to inform the access terminal incorrect password when the verification fails.

6. The network sharing system according to claim 4, wherein the method further comprises:

prompting a user to input a name and a password of the WiFi hotspot as receiving a WiFi hotspot creating operation of the user;

receiving the name and the password of the WiFi hotspot input by the user, and saving the same as the preset hotspot name and password; and detecting whether the terminal device enables the WiFi function.

\* \* \* \* \*